Jan. 11, 1955
J. L. LEATHERMAN
2,699,350
GATE LATCH
Filed Sept. 15, 1950
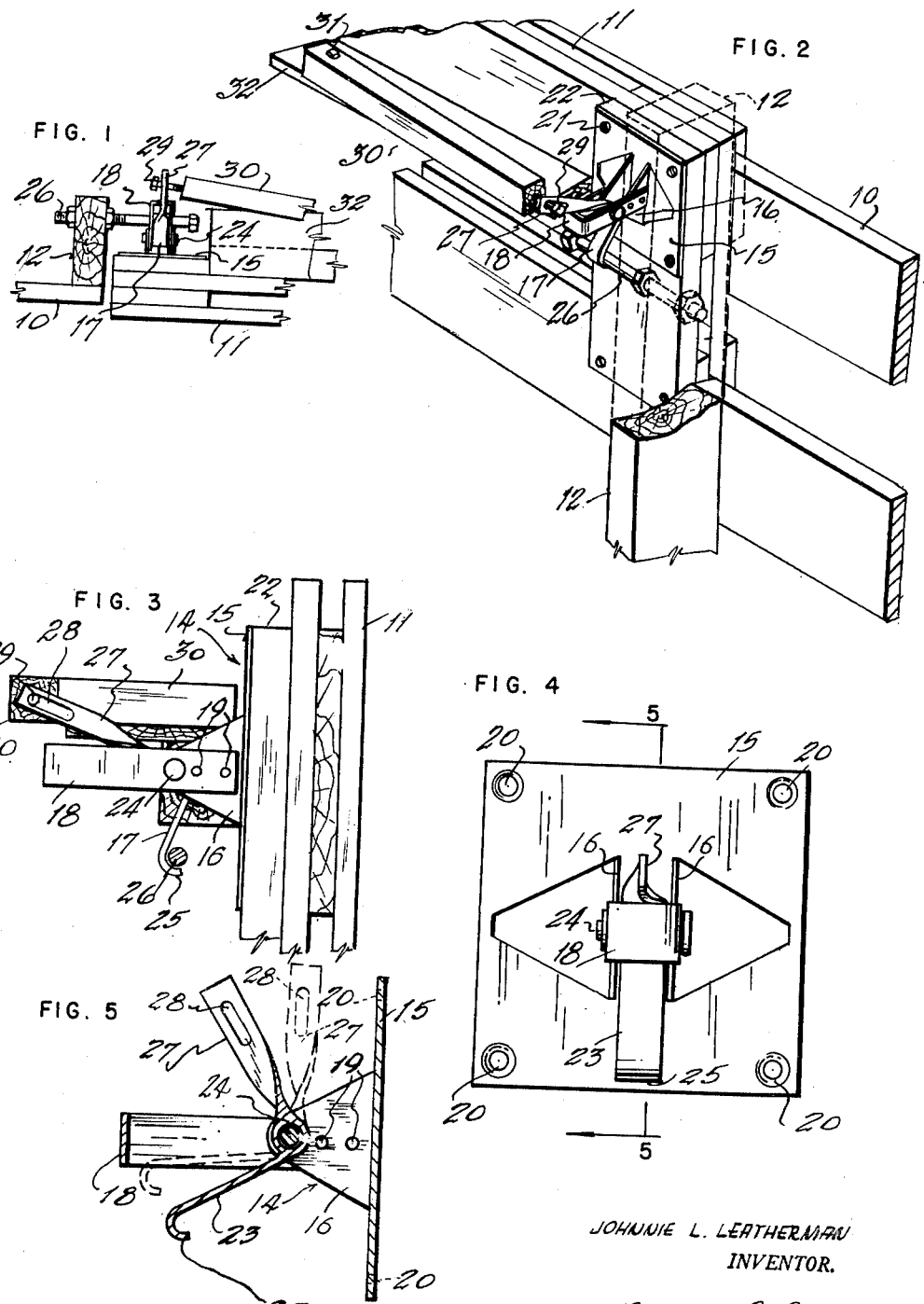
JOHNNIE L. LEATHERMAN
INVENTOR.
BY *Cecil L. Thord*
ATTORNEY

2,699,350

GATE LATCH

Johnnie Lee Leatherman, Millsap, Tex.

Application September 15, 1950, Serial No. 185,096

2 Claims. (Cl. 292—100)

This invention relates to latching devices for gates and doors, particularly of the type used in dairy barns, and the like, and it has especial adaptation for use in latching stall gates housing milch cows during the process of milking, and its principal object resides in the provision of a semi-automatic latch capable of retaining the gate or door closed against the entrance of animals outside the stall, though providing means whereby the enclosed animal, by pressure upon elements connected into the latch to actuate the same to cause the door to open, the closure having tensioned means thereon for retaining the same in its closed and latched condition while not in use.

Another object of the invention is that of providing a simple and economical structure, readily adaptable to use on any type of stall door, where it is desirable that means be provided for allowing the animal to depart from the stall, unlatching the gate automatically, but preventing ingress through the opening from the exterior.

Broadly, the invention contemplates the provision of a latch which can be utilized in instances where dairy cattle, for example, are housed in the stall, and after the milking operation is completed, allow the animals to depart without having to return to open the door, and providing for the isolation of the animal against those outside the stall from interfering with it during milking or feeding time.

While the foregoing objects are paramount, other and lesser objects will become manifest as the description proceeds, taken in connection with the appended drawings wherein:

Figure 1 is a fragmentary top plan view of the invention, illustrating the latch on the closure and the latch bolt attached to the door post.

Figure 2 is a fragmentary perspective illustration, showing a portion of the door post cut away, illustrating the latch bolt inserted through the door post, and showing the actuating bar.

Figure 3 is a fragmentary end elevational view of the latch assembly and latch bar, the door post being shown removed to illustrate the position of the latch in operative position.

Figure 4 is a front elevational view of the latch assembly, and

Figure 5 is a vertical sectional view through the latch assembly, on lines 5—5 of Figure 4, showing the substantially L-shaped latch member.

Among small dairymen and farmers it is sometimes customary to provide a stall, or a plurality of stalls, for milking each of a small herd of cattle, and sometimes during milking operations, several cows are milked in the same stall. Particularly in use by small farmers, having only one or two cows to milk, it is desirable to leave the last cow to be milked in the stall after the milking operation is completed in order that she may finish her feed. In order to avoid the necessity for returning to the stall to open the closure and allow the cow to depart, it is desirable to provide means whereby the animal may herself, by pressure upon a special bar, unlatch the closure to open the stall, although the door or gate has been retained closed against animals outside the stall from entering and causing disturbance, particularly if the animals outside the stall are more aggressive.

The invention, therefore, comprises a latch member which is capable of being installed on a swinging gate or door providing a closure for an opening into a stall. The latch assembly is attached to the swinging closure while a latch pin or bolt is arranged through or attached to the door or gate post against which the closure is operated. Usually the stall, particularly in mild climates, is closed on one end by spaced boards or slats 10 and the closure 11 is also made accordingly, as shown in Figure 2. The gate or door post 12 serves as a jamb against which the closure 11 operates and is an integral part of the wall 10. The gate 11 is hinged on an opposite post (not shown) and may be provided with a light spring serving to normally retain the gate or door closed and latched, as indicated at Figure 2.

The latch consists of a bracket member 14 which is formed from a base plate 15 by forming flanges 16 and turning these at right angles to the plate 15, as shown in Figures 3 and 5, so that they are spaced, as in Figure 4, and pivoting an L-shaped latch member 17 therebetween which is enclosed by a substantially U-shaped member 18 secured by a rivet 19 to the right-angular extended members 14 integral with the base plate 15. The base plate 15 is substantially rectangular in form and has apertures 20 by which it can be secured by screws 21, or other suitable means, to a mounting block 22 attached to the gate or closure member 11, in the manner shown in Figures 2 and 3.

The latch member 17 has one leg 23 depending from the pivot 24 and has a hook 25 thereon adapted to overreach and be detained by a latch pin or bolt 26, shown in Figures 2 and 3. The opposite leg 27 extends upwardly and outwardly, at an angle, in the manner shown in Figure 3, and has a slot 28 formed longitudinally thereof near its outer end. Through the slot 28 is arranged a pin 29 extending into the end of a latch bar 30 which is hinged by a bolt 31 or other suitable means, on its opposite end to a wooden plate 32 attached to the closure 11 and arranged horizontally with respect thereto, as illustrated in Figure 2. By the association just described, between the latch member 17 and the latch bars 30, pressure upon the latch bar 30 inwardly toward the closure 11 would operate the latch member 17 to raise the hook 25 thereof and release the same from the latch bolt or pin 26.

By a tensioning means, such as a spring, attached to the closure 11, the latter will be drawn shut immediately after an animal has passed through the opening and release the closure 11, causing the latter to suddenly shut with the result that the latch bar 30 will be urged outwardly by the resultant jar and cause the latch member 17 to engage the pin 26 to automatically latch the gate. It is not essential, however, that the gate be latched after the animal has left the stall but it is desirable that the gate or closure be closed to prevent entry into the stall of other animals. A simple pressure upon the bar 30 will cause the latch member 17 to be released from the latch pin 26 to cause the gate to open and when continued pressure is applied so as to swing the gate outwardly upon its hinges. Obviously, a spring may be applied to the bar 30 to retain the same normally in extended position, such as that shown in Figures 1, 2 and 3, but this is not desirable in view of the fact that the latch member 17 will remain in its depending or operative position, shown in Figures 2 and 5, and would not, therefore, pass over the pin 26 where it would engage the same, in the manner shown in Figure 3, to retain the closure 11 shut.

Manifestly, the structure herein shown and described is capable of certain changes and modifications, from time to time, by persons skilled in the art without departing from the spirit and intent of the invention or the scope of the appended claims.

What is claimed is:

1. In a latch mechanism adapted for use on a barn door, said latch mechanism comprising, in combination with a closure post and a latch pin on said post, a bracket attached to said door having a base plate and a pair of spaced parallel flanges formed therewith and extending at right-angles therefrom in a vertical plane, an L-shaped latch member pivoted between the said flanges for movement in a vertical arc and having a hook on its lower leg embracing said latch pin, a slot formed longitudinally of the upper leg of said latch member, a latch bar on said door having one end pivoted thereto and having a pin in its free end extending through said slot in said upper leg, and a U-shaped stop member enclosing said latch.

2. In a latch mechanism adapted for use on a barn door, said latch mechanism comprising, in combination with a latch post and a latch pin on said latch post, a latch bracket on said door having a base plate and vertical parallel spaced flanges formed therewith and extending at right-angles therefrom, a latch member pivotally secured between said flanges and having an upper and a lower leg in right angular relationship to each other, the said lower leg having a hook formed thereon engageable with and overreaching said latch pin, a slot formed in the outer end of said upper leg, a latch bar having one end pivoted to said door and a pin in its opposite end extending through said slot whereby to actuate said latch member in a vertical arc, and a U-shaped enclosure for said latch member connected to said flanges and providing a stop for said upper leg.

References Cited in the file of this patent

UNITED STATES PATENTS

| | | |
|---|---|---|
| 975,456 | Prevost | Nov. 15, 1910 |
| 1,927,720 | St. Clair | Sept. 19, 1933 |
| 2,481,990 | Ehrke | Sept. 13, 1949 |